(12) United States Patent
Jintaseranee et al.

(10) Patent No.: US 9,282,529 B1
(45) Date of Patent: Mar. 8, 2016

(54) IDENTIFICATION OF DORMANT WIRELESS COMMUNICATION DEVICES IN WIRELESS COMMUNICATION SYSTEMS

(71) Applicant: Sprint Communications Company L.P., Overland Park, KS (US)

(72) Inventors: Kosol Jintaseranee, Millbrae, CA (US); Sara Gatmir-Motahari, Millbrae, CA (US); Mark Evans, San Mateo, CA (US); Mark J. Bonn, Granite Bay, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 217 days.

(21) Appl. No.: 13/852,136

(22) Filed: Mar. 28, 2013

(51) Int. Cl.
*H04W 4/00* (2009.01)
*H04W 64/00* (2009.01)

(52) U.S. Cl.
CPC ..................................... *H04W 64/00* (2013.01)

(58) Field of Classification Search
CPC ...... H04W 60/00; H04W 60/02; H04W 60/04
See application file for complete search history.

(56) References Cited

U.S. PATENT DOCUMENTS

| | | | |
|---|---|---|---|
| 5,953,667 A * | 9/1999 | Kauppi | 455/440 |
| 7,590,421 B2 | 9/2009 | Ryu et al. | |
| 7,636,563 B2 | 12/2009 | Kim et al. | |
| 7,894,831 B2 * | 2/2011 | Ryu et al. | 455/458 |
| 7,949,352 B2 | 5/2011 | Ryu et al. | |
| 2004/0254980 A1 | 12/2004 | Motegi et al. | |
| 2005/0048982 A1 | 3/2005 | Roland et al. | |
| 2006/0198344 A1 | 9/2006 | Teague et al. | |
| 2006/0286982 A1 * | 12/2006 | Prakash et al. | 455/435.1 |
| 2007/0010294 A1 | 1/2007 | Shinoda et al. | |
| 2010/0002720 A1 * | 1/2010 | Ji et al. | 370/459 |
| 2013/0150035 A1 * | 6/2013 | Chande et al. | 455/435.1 |

* cited by examiner

*Primary Examiner* — Vladimir Magloire
*Assistant Examiner* — Shantell L Heiber (57) ABSTRACT

Systems, methods, and software for identifying dormant wireless communication devices in wireless communication systems are provided herein. In one example, a method of operating a wireless communication system is provided. The method includes providing wireless access to communication services to wireless communication devices, where the wireless communication devices are associated with at least a first paging zone. The method also includes instructing the wireless communication devices associated with the first paging zone to associate with a temporary paging zone identifier and responsively receiving indications of the temporary paging zone identifier transferred by at least a portion of the wireless communication devices. The method also includes identifying dormant ones of the wireless communication devices based on which of the ones of the wireless communication devices transfer the indications, and instructing the wireless communication devices associated with the temporary paging zone identifier to resume association with the first paging zone.

8 Claims, 5 Drawing Sheets

IDENTIFICATION OF DORMANT WIRELESS COMMUNICATION DEVICES IN WIRELESS COMMUNICATION SYSTEMS

TECHNICAL FIELD

Aspects of the disclosure are related to the field of communications, and in particular, identification of dormant wireless communication devices in wireless communication networks.

TECHNICAL BACKGROUND

Wireless communication systems, such as cellular voice and data networks, typically include multiple wireless access nodes spread over a geographic area through which wireless communication devices can register and receive wireless access to communication services. In many examples, the wireless communication devices are mobile, and can move between wireless coverage areas of the wireless access nodes. The wireless communication devices typically provide information to the wireless communication network when registering with a wireless access node. This information can include which wireless access node through which the wireless communication device has registered as well as paging zone information.

The wireless communication system also typically transfers information to the wireless communication devices to indicate incoming calls, text messages, or other network alerts. This information, many times referred to as pages, must be routed through the wireless access nodes to reach the wireless communication devices. To assist in the routing of the pages, a large wireless communication system can be subdivided into various zones, called paging zones, each with an associated paging zone identifier. These paging zones allow for more efficient delivery of pages to wireless communication devices.

Also, wireless communication devices can be in one of many different operating modes. For example, in an active mode, a wireless communication device can be exchanging communications through a wireless access node, such as during a voice call, data exchange, or other communication session. Wireless communication devices can also be in idle modes and dormant modes, which have lower levels of communication activities and registration states associated therewith. In an active state or active mode, the location of a wireless communication device can be determined by the wireless communication system via querying the wireless communication device or by trilateration and other techniques. However, in a dormant state or dormant mode, a wireless communication device is typically not presently communicating through any wireless access node, and thus the location or identity of dormant wireless communication devices is typically not known or determinable by the wireless communication system.

Overview

Systems, methods, and software for identifying dormant wireless communication devices in wireless communication systems are provided herein. In one example, a method of operating a wireless communication system is provided. The method includes providing wireless access to communication services to wireless communication devices, where the wireless communication devices are associated with at least a first paging zone comprising wireless access nodes. The method also includes instructing the wireless communication devices associated with the first paging zone to associate with a temporary paging zone identifier and responsively receiving at least indications of the temporary paging zone identifier transferred by at least a portion of the wireless communication devices. The method also includes identifying dormant ones of the wireless communication devices based on which of the ones of the wireless communication devices transfer the indications, and instructing the wireless communication devices associated with the temporary paging zone identifier to resume association with the first paging zone.

In another example, a wireless communication system is provided. The wireless communication system includes a plurality of wireless access nodes comprising at least a first paging zone configured to provide wireless access to communication services to a plurality of wireless communication devices associated with at least the first paging zone. The wireless communication system also includes a page control system configured to instruct ones of the wireless communication devices associated with the first paging zone to associate with a temporary paging zone identifier and responsively receive at least indications of the temporary paging zone identifier transferred by at least a portion of the ones of the wireless communication devices. The page control system is configured to identify dormant ones of the wireless communication devices based on at least which of the ones of the wireless communication devices transfer the indications. The page control system is configured to instruct the ones of the wireless communication devices associated with the temporary paging zone identifier to resume association with the first paging zone.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Wireless communication systems provide wireless access to communication services for user devices, such as phones, smartphones, computing devices, and other wireless communication devices. The wireless access can be provided via various wireless access nodes distributed over a geographic region, such as a city or state. As a first example of a wireless communication system, FIG. 1 is presented.

Figure 1:
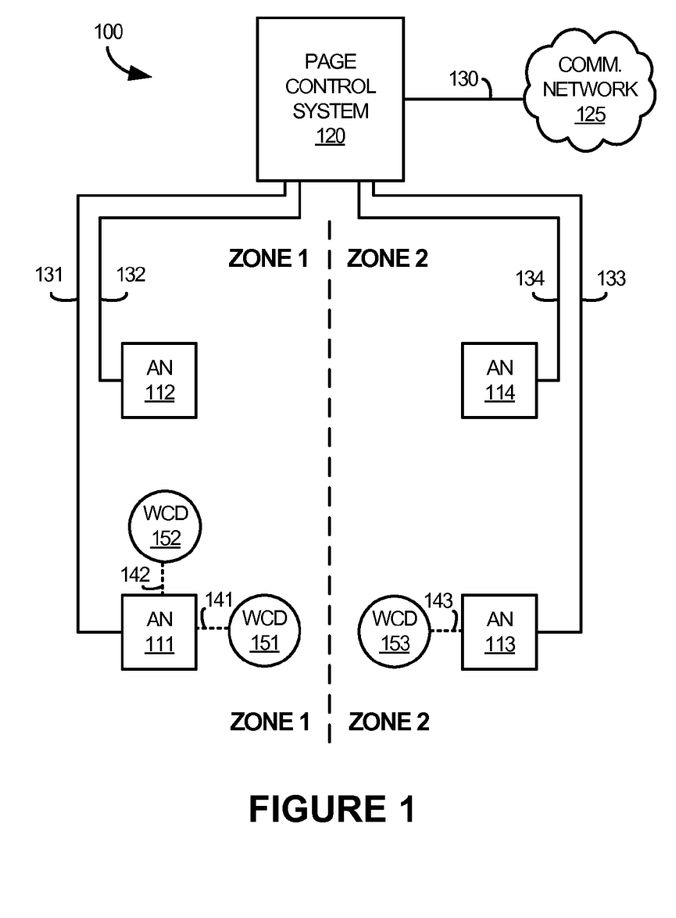
FIG. 1 is a system diagram illustrating a communication system.

FIG. 1 is a system diagram illustrating communication system 100. Communication system 100 includes wireless access nodes (AN) 111-114, page control system 120, communication network 125, and wireless communication devices (WCD) 151-153. AN 111-114 and page control system 120 communicate over associated links 131-134. Page control system 120 and communication network 125 communicate over link 130. WCD 151 and AN 111 communicate over wireless link 141. WCD 152 and AN 111 communicate over wireless link 142. WCD 153 and AN 113 communicate over wireless link 143. Although not shown for clarity in FIG. 1, AN 111-114 each communicate with other equipment and systems associated with communication network 125, such as routing nodes, switching nodes, processing nodes, or other communication handling nodes.

In addition to user communications, such as voice calls, data exchange, web access, and the like, pages can be transferred for delivery to wireless communication devices over communication system 100. Pages or paging information can include data, packets, or indications about incoming calls, text messages, or other network alerts and information. Pages are typically routed through page control system 120 for delivery to wireless communication devices. Page control system 120 can track which wireless communication devices are included in the various paging zones and transfer the pages for delivery within the associated paging zone instead of the entire communication system 100.

As shown in FIG. 1, wireless access nodes 111-114 are separated into two paging zones, labeled as "zone 1" and "zone 2" in FIG. 1. These paging zones relate to how pages or paging information is delivered to wireless communication devices in communication system 100 by page control system 120. Typically, when a wireless communication device registers for wireless access through a specific wireless access node, the paging zone is reported to the wireless communication device by the wireless access node. This paging zone can then be reported by the wireless communication device to elements in communication system 100, such as page control system 120. Other information can be reported by the wireless communication device in the registration process, such as an identity of the wireless communication device (e.g. electronic serial number (ESN), mobile station identifier (MSID), and network access identifier (NAI)), indicators or identifiers of present wireless access nodes or sectors, timestamps, and other information.

Figure 2:
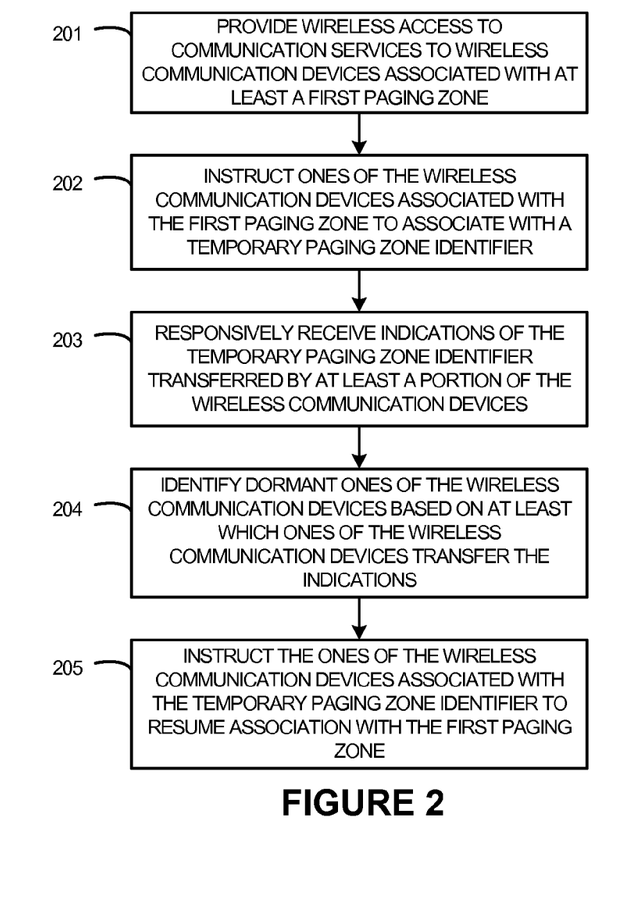
FIG. 2 is a flow diagram illustrating a method of operation of a communication system.

As an example operation of communication system 100, FIG. 2 is presented. FIG. 2 is a flow diagram illustrating a method of operation of communication system 100. The operations of FIG. 2 are referenced below parenthetically. In FIG. 2, communication system 100 provides (201) wireless access to communication services to wireless communication devices associated with at least a first paging zone. The wireless access of communication system 100 is provided by wireless access nodes (AN) 111-114, page control system 120, and communication network 125. As discussed above, two paging zones are included in FIG. 1, with WCD 151-152 located in paging zone 1, and WCD 153 located in paging zone 2. AN 111-112 comprise paging zone 1, and AN 113-114 comprise paging zone 2. Further paging zones, paging zone configurations, and ANs can be included in other examples. In this example, paging zone '1' will be considered, but paging zone '2' can instead be considered.

Page control system 120 instructs (202) ones of the wireless communication devices associated with the first paging zone to associate with a temporary paging zone identifier. In this example, page control system 120 can instruct ones of WCD 151-152 in an indirect manner by first requesting ones of AN 111-112 associate with a temporary paging zone identifier that is different than a first, or present, paging zone, such as by instructing AN 111-112 to use a temporary paging zone identifier instead of the first paging zone identifier. Page control system 120 can transfer the new paging zone identifier to AN 111-112 over associated ones of links 131-132.

Page control system 120 responsively receives (203) at least indications of the temporary paging zone identifier transferred by at least a portion of the wireless communication devices. Ones of AN 111-112 report the temporary paging zone identifier to wireless communication devices, such as within control signaling messages or broadcast to all wireless communication devices within range. Once a wireless access node reports the temporary paging zone identifier to a wireless communication device, the wireless communication device can responsively report this temporary paging zone identifier to page control system 120, or other control or switching systems of communication system 100. An association between an identity of wireless communication device and the paging zone identifier can thus be maintained by page control system 120 or other elements of communication system 100. In some examples, this association can be used for delivery of pages to only the specific paging zone for a wireless communication device instead of an entire network. However, in this example, the temporary paging zone identifier is not used for delivery of pages, and instead is used to identify and/or locate dormant wireless communication devices as discussed herein.

Not all wireless communication devices are operating in an active mode of operation in FIG. 1, as some wireless communication devices might be in a dormant mode of operation. In the dormant mode, a communication session is not active along with other reduced levels of operation and/or registration. The wireless communication devices which are presently in a dormant mode periodically check with a wireless access node for network alerts, pages, control signaling messages, and other information, which can include paging zone identifiers. Thus, the dormant wireless communication devices eventually receive the temporary paging zone identifier from a wireless access node, and responsive to detecting a change in paging zone identifier, register for wireless access and report this temporary paging zone identifier, along with other information and identities, to page control system 120. Among this other information, the wireless communication devices transfer indications or identities of a present wireless access node through which the wireless communication device is registered or has last registered for wireless access.

Page control system 120 identifies (204) dormant ones of the wireless communication devices based on at least which ones of the wireless communication devices transfer the indications. The wireless communication devices that register for wireless access or report the temporary paging zone identifier responsive to the change in paging zone identifier can be identified as dormant wireless communication devices. Wireless communication devices in an active mode of operation can also report the temporary paging zone identifier to page control system 120, but these devices are typically already known, located, or identified by page control system 120 or other elements of communication system 100 due to their active state of operation. Thus, newly identified wireless communication devices which report the temporary paging zone identifier can be considered dormant wireless communication devices. During the registration process, the dormant wireless communication devices can switch to a registration mode or active mode or operation temporarily. Once the registration process is complete, along with any paging zone reporting, the dormant wireless communication devices can resume the dormant state of operation.

Page control system 120 instructs (205) the ones of the wireless communication devices associated with the temporary paging zone identifier to resume association with the first paging zone. As in operation 202, page control system 120 can instruct ones of WCD 151-152 in an indirect manner by first requesting ones of AN 111-112 to re-associate with the first paging zone identifier instead of the temporary paging zone identifier, such as by instructing AN 111-112 to use the first paging zone identifier again. Page control system 120 can transfer the first paging zone identifier to AN 111-112 over associated ones of links 131-132. As in operation 203, page control system 120 can then responsively receive at least indications of the first paging zone identifier transferred by at least a portion of the wireless communication devices.

Figure 3:
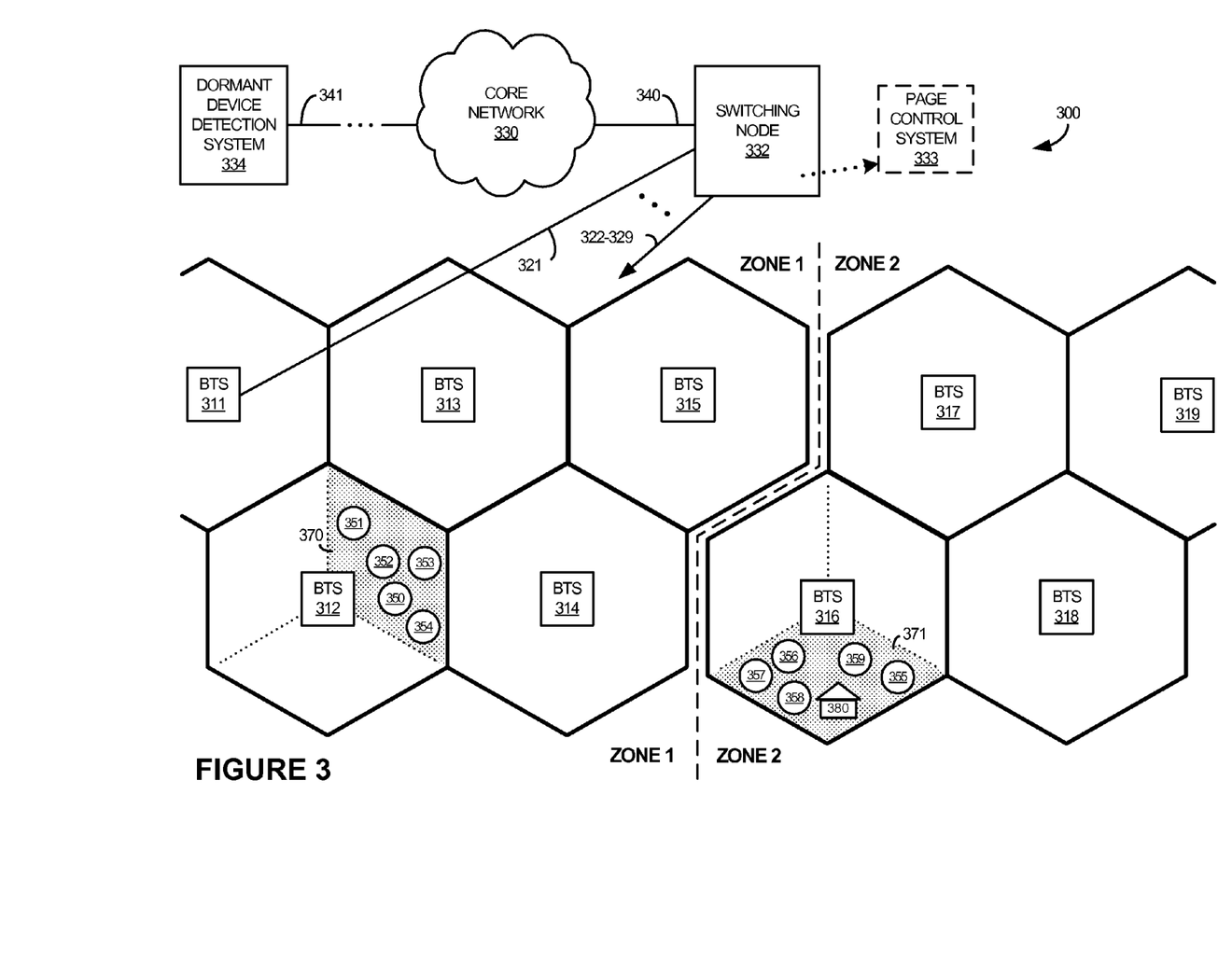
FIG. 3 is a system diagram illustrating a communication system.

FIG. 3 is a system diagram illustrating communication system 300. Communication system 300 comprises a cellular voice and data network in this example, although other networks and systems can be employed. Communication system 300 includes elements such as base transceiver stations (BTS) 311-319, core network 330, switching node 332, dormant device detection (DDD) system 334, and user devices 351-359. Each BTS 311-319 communicates with switching node 332 over an associated backhaul link 321-329. Backhaul links 321-329 each comprise a T1 link in this example. Each user device 351-359 communicates with an associated BTS over a wireless link, which are not shown in this example for clarity. The wireless links can comprise wireless cellular voice and data links, such as discussed for wireless links 141-143 in FIG. 1. Switching node 332 and core network 330 communicate over link 340 in this example which comprises an optical networking link. Core network 330 and DDD system 334 communicate over link 341 which comprises one or more networking links in this example, and can include further communication networks, such as the Internet.

BTS 311-319 each comprise base transceiver station equipment which can include transceivers, antennas, and other communication equipment, such as that for wireless access nodes 111-114 of FIG. 1. User devices 351-359 each comprise a cellular communication device, such as a smartphone, feature phone, or other user communication device. Switching node 332 comprises switching, routing, and processing equipment and systems, and can comprise a mobile switching center (MSC) equipment, radio node controller (RNC) equipment, mobile management entity (MME) equipment, or other equipment and systems. Switching node 332 includes page control system 333 in this example, and page control system 333 can comprise one or more elements discussed for switching node 332 or page control system 120 of FIG. 1. Core network 330 comprises a core network of a cellular voice and data system, such as routers, switches, wireless access nodes, processing nodes, and other equipment such as that discussed for communication network 125 of FIG. 1.

DDD system 334 can include communication or network interfaces, as well as computer systems, microprocessors, user interfaces, circuitry, or some other processing devices or software systems, and can be distributed among multiple processing devices. Examples of DDD system 334 can also include software such as an operating system, logs, databases, utilities, drivers, networking software, and other software stored on a computer-readable medium. Dormant device detection system 334 can also include elements of FIG. 5, as well as user interface equipment, for receiving and transferring requests to identify dormant user devices associated with a physical location.

BTS 311-319 each provide wireless access to communication services within a wireless coverage area indicated by the hexagonal regions in FIG. 3. Additionally, each hexagonal region of wireless coverage can be subdivided into sectors, such as that shown for sector 370 and sector 371, which can be serviced by one or more separate antennas and transceivers. In this example, user devices 351-354 are presently located in sector 370 of BTS 312, and can receive wireless access to communication services from BTS 312. Also in this example, user devices 355-359 are presently located in sector 371 of BTS 316, and can receive wireless access to communication services from BTS 316. It should be understood that further user devices and BTS equipment can be included, and that the hexagonal wireless coverage regions of FIG. 3 are merely representative of wireless coverage areas.

BTS 311-319 are also grouped into two separate paging zones, namely paging zone 1 and paging zone 2, as indicated in FIG. 3. As discussed above, these paging zones relate to how pages or paging information is delivered to user devices in communication system 300 by page control system 333 of switching node 332. Typically, when a user device registers for wireless access through a specific BTS, the paging zone is reported to the user device by the BTS, such as over control signaling. This paging zone can then be reported by the user device to elements in communication system 300, such as page control system 333. Other information can be reported by the user device in the registration process, such as an identity of the user device (e.g. electronic serial number (ESN), mobile station identifier (MSID), network access identifier (NAI), phone number, and subscriber name), indicators or identifiers of present BTS or sectors, timestamps, and other information. This paging zone can be used for delivery of pages to only the specific paging zone for a user device instead of an entire network.

Figure 4:
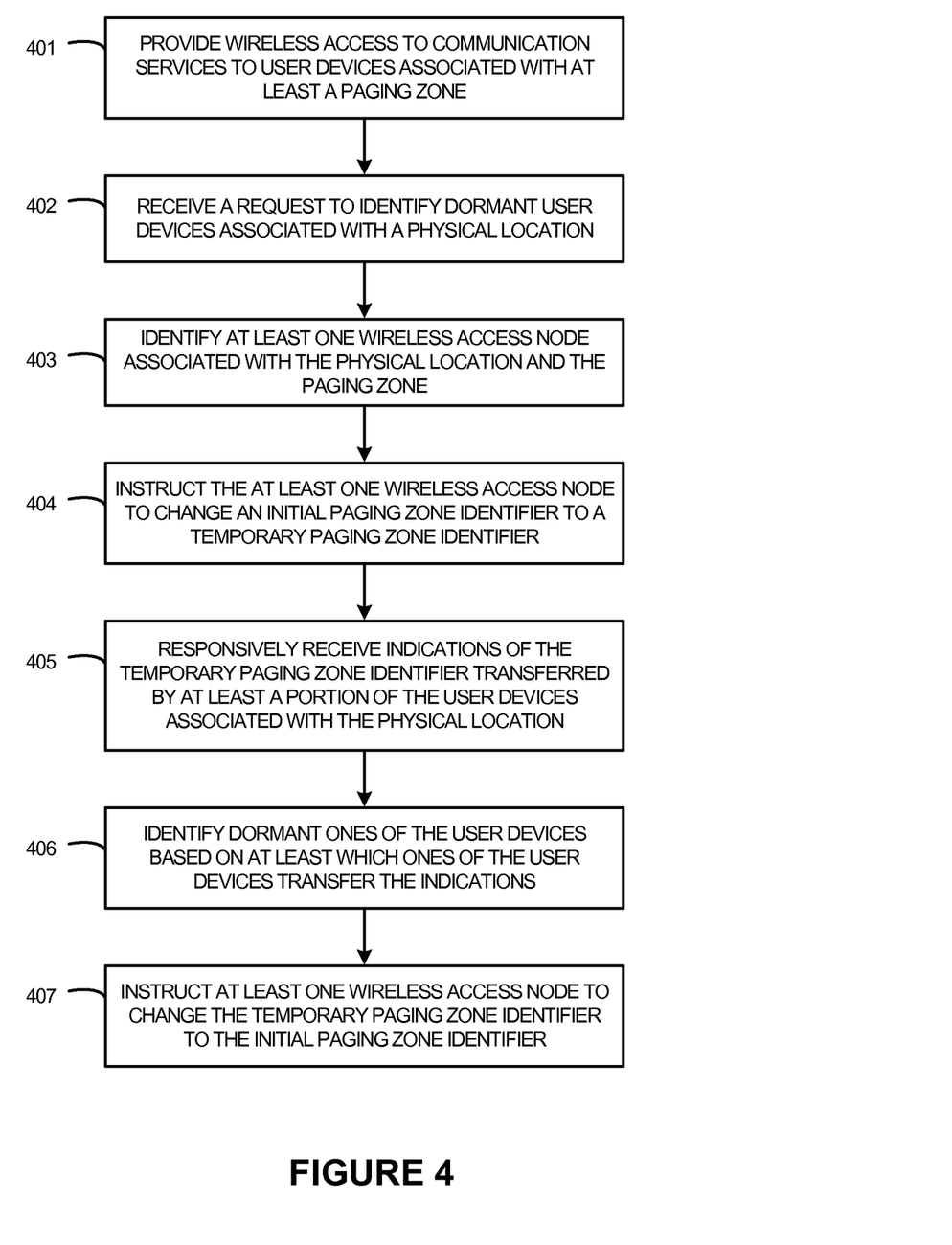
FIG. 4 is a flow diagram illustrating a method of operation of a communication system.

As an example method of operating elements of communication system 300, FIG. 4 is presented. FIG. 4 is a flow diagram illustrating a method of operation of communication system 300. The operations of FIG. 4 are referenced below parenthetically. In FIG. 4, communication system 300 provides (401) wireless access to communication services to user devices associated with at least a paging zone. In this example, two paging zones are included, as discussed above. However, paging zone 2 will be considered in FIG. 4, although paging zone 1 can instead be considered. User devices 355-359 are presently in paging zone 2, and can receive wireless access to communication services in sector 371 from BTS 316. The communication services can include voice calls, data transfer, web access, chat, text messaging, multimedia streaming, games, or other communication services.

Switching node 332 receives (402) a request to identify dormant user devices associated with a physical location. In this example, the request is transferred by dormant device detection (DDD) system 334, and the request is transferred for delivery to elements of communication system 300 over link 341. The request can be originated by a user or device associated with law enforcement or fire protection services in some examples. Switching node 332 receives the request transferred by DDD system 334. The request can identify a physical location such as a building, stadium, park, roadway, geographic coordinates, or other physical location. In other examples, the request can identify a base station, wireless access node, BTS, or wireless coverage sector. In this example, the request identifies a building, such as school 380 in FIG. 3, and includes identifying information for the physical location, such as an address or geographic coordinates.

Switching node 332 identifies (403) at least one wireless access node associated with the physical location and the paging zone. The physical location is processed to identify at least one wireless access node associated with the physical location and the paging zone, namely BTS 316 and paging zone 2. Further, sector 371 is identified as the particular wireless coverage sector provided by BTS 316 associated with the physical location. The identification can occur via a data structure, database, or mapping software to identify a BTS or sector associated with a physical location. Additional locations or equipment can be identified, such as neighboring BTS equipment or neighboring sectors.

Switching node 332 or page control system 333 instructs dormant user devices associated with the physical location and the paging zone to associate with a temporary paging zone identifier. Switching node 332 or page control system 333 indirectly enacts this instruction to dormant user devices by propagating the paging zone identifier change through a current BTS associated with the physical location and paging zone. Specifically, switching node 332 or page control system 333 instructs (404) the at least one wireless access node to change an initial paging zone identifier to a temporary paging zone identifier. Switching node 332 or page control system 333 transfers a request to BTS 316 over at least backhaul link 326 to change an initial paging zone identifier associated with paging zone 2 to a temporary paging zone identifier. The paging zone identifier associated with paging zone 2 is typically used to route pages for delivery to each BTS associated with paging zone 2. However, the temporary paging zone identifier in this example is not used in the delivery of pages, and can be a fake, unique, or pseudo-random paging zone identifier.

Responsive to receiving the request to change the paging zone identifier to the temporary paging zone identifier, BTS 316 transfers the temporary paging zone identifier in a control signaling message indicating the paging zone to user devices in communication with BTS 316. Further, BTS 316 only transfers this temporary paging zone identifier using transceiver and antenna equipment associated with sector 371, and thus user devices 355-359 can receive the temporary paging zone identifier. The control signaling message can be broadcast by BTS 316 within sector 371 in control signaling, such as network parameter messages, sector parameter messages, pilot signals, beacon signals, or other signals and control messaging, including combinations and variations thereof.

Switching node 332 responsively receives (405) at least indications of the temporary paging zone identifier transferred by at least a portion of the user devices associated with the physical location. User devices in this example perform zone-based registration with communication system 300 periodically after a predetermined period of time. Dormant user devices can move within zone 2 without re-registering for wireless service, and thus dormant user devices might not be identified, known, or located by elements of communication system 300, such as by switching node 332 or page control system 333. The dormant user devices typically wake up after the predetermined period of time and check for paging messages, such as text messages or incoming voice calls, and also to check for paging zone changes.

In this example, dormant ones of user devices 355-359 already have a presently configured paging zone, which can be the identifier for paging zone 2. Upon expiration of the predetermined period of time, dormant ones of user devices 355-359 check for paging messages and for paging zone changes. The predetermined period of time can be fixed in duration, or can vary based on loading conditions of sector 371, among other considerations. Since the temporary paging zone identifier is now broadcast by BTS 316 in sector 371, the dormant user devices detect this change, and responsively update the temporary paging zone identifier to be the presently configured paging zone and initiate a registration process with BTS 316. This registration process includes transferring the presently configured paging zone for delivery to a paging system, such as page control system 333. Further information can be included with this registration process and transferred for delivery to page control system 333, such as an identity of the user device (e.g. electronic serial number (ESN), mobile station identifier (MSID), network access identifier (NAI), phone number, and subscriber name), indicators or identifiers of present BTS or sectors, timestamps, and other information. Thus, the change of the paging zone for sector 371 of BTS 316 forces dormant user devices which are in sector 371 to re-register for wireless access and subsequently report the temporary paging zone identifier to page control system 333.

Switching node 332 identifies (406) dormant ones of the user devices based on at least which ones of the user devices transfer the indications. The dormant ones of user devices 355-359 transfer the indications due to being forced to register for wireless access responsive to the paging zone change. Thus, switching node 332 or page control system 333 can identify the dormant ones of user devices 355-359 by identifying which user devices report the temporary paging zone identifier to page control system 333. Additional information transferred during the registration process, such as an identity of the user device or a present BTS or sector, can also be used in identifying or locating the dormant ones of the user devices.

In further examples, the location of dormant user devices can be identified based on information reported during the registration process prompted by the paging zone change. For example, if a wireless access node identifier, BTS identifier, or sector identifier is reported along with the paging zone information to page control system 333 by user devices, then the location of the dormant user devices can be identified. This location can confirm that the dormant user devices are located in the associated sector or nearby the associated BTS.

The temporary paging zone identifier can comprise a unique identifier aiding in identification of the dormant user devices. For example, the unique identifier can be used to correlate user devices in sector 371 with the request to identify dormant user devices in operation 402. If multiple requests are received to identify dormant user devices in further sectors, then different temporary paging zone identifiers for each request, and these different identifiers can be employed to correlate these requests to the associated sectors.

Non-dormant user devices, such as user devices in an active mode of operation or engaged in a present communication session, can use both the original paging zone identifier associated with paging zone 2 and the temporary paging zone identifier for a period of time until switching to only the temporary paging zone identifier. In such examples, the active user devices are typically already identified, known, or located by elements of communication system 300, such as by page control system 333 or authorization or billing systems of communication system 300, and thus are not identified as dormant user devices.

Switching node 332 instructs (407) the at least one wireless access node to change the temporary paging zone identifier back to the initial paging zone identifier. In this example, page control system 333 of switching node 332 requests that BTS 316 change the paging zone identifier from the temporary paging zone identifier for sector 371 back to the initial paging zone identifier associated with paging zone 2. The paging zone identifier associated with paging zone 2 is then used to route pages for delivery to each BTS associated with paging zone 2.

The duration of the change from the initial paging zone to using the temporary paging zone identifier can vary based on several factors. A first factor can be the based on the period of time that dormant user devices use to wake up and check for pages and paging zone changes. A second factor can be loading conditions of communication system 300 or sector 371, with a longer duration associated with a higher loading. Since each user device can wake up at a different instance in time, a specific duration might not capture all dormant user devices if too short. Similarly, since the temporary paging zone identifier is not used in the delivery of pages in this example, then too long of a duration can lead to missed pages for dormant user devices. Thus, the duration of the change from the initial paging zone to the temporary paging zone identifier can be based on capturing a desired percentage of dormant user devices while not being too long to prevent delivery of pages.

As in operation 404, responsive to receiving the request to change the paging zone identifier back to the initial paging zone identifier, BTS 316 transfers the initial paging zone identifier in a control signaling message indicating the paging zone to user devices in communication with BTS 316. Also, as in operation 405, ones of the user devices in sector 371 can report this initial paging zone identifier to page control system 333 responsive to detecting the change in paging zone identifier from BTS 316. Thus, sector 371 of BTS 316 resumes using the original or initial paging zone identifier associated with paging zone 2 and ceases using the temporary paging zone identifier.

Figure 5:
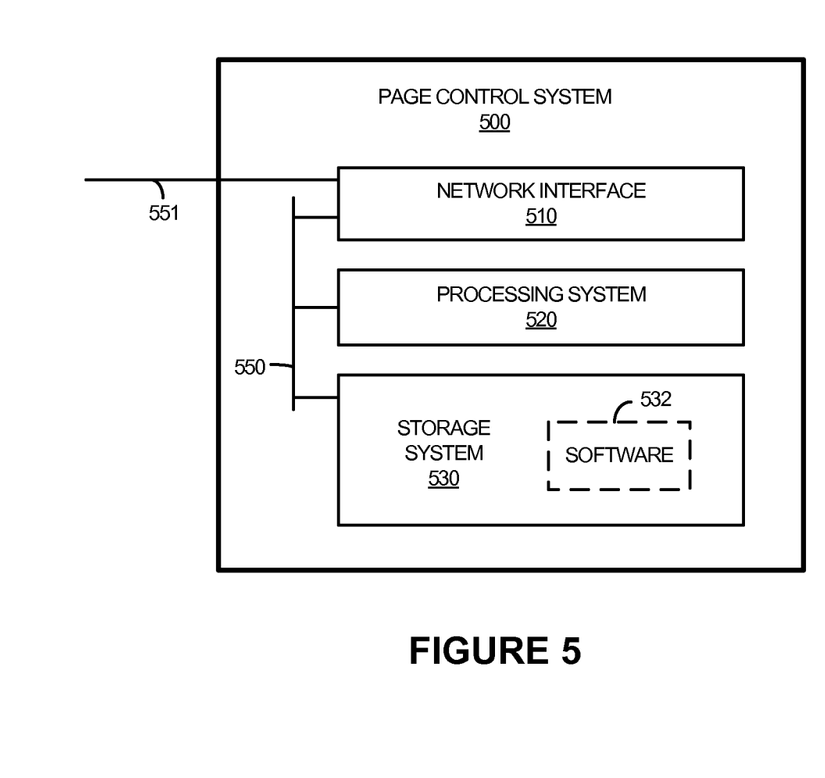
FIG. 5 is a block diagram illustrating a paging control system.

FIG. 5 is a block diagram illustrating page control system, as an example of page control system 120 of FIG. 1 or switching node 332 of FIG. 3, although page control system 120 or switching node 332 can use other configurations. Page control system 500 includes Network interface 510, backhaul transceiver portion 515, processing system 520, and storage system 530. Network interface 510, processing system 520, and storage system 530 are shown to communicate over a common bus 550 for illustrative purposes. It should be understood that discrete links can be employed, such as data links, power links, RF links, or other links. Page control system 500 can be distributed or consolidated among equipment or circuitry that together forms the elements of Page control system 500. Page control system 500 can optionally include additional devices, features, or functionality not discussed here for purposes of brevity.

Network interface 510 comprises one or more transceivers and communication interface circuitry for communicating over a network with at least wireless access nodes of a communication system, such as with other wireless access nodes or base stations of a cellular voice and data network. Network interface 510 also receives command and control information and instructions from processing system 520 for controlling the operations of communications over link 551. Link 551 can use various protocols or communication formats as described herein for links 130-133, links 141-143, links 321-329, or links 340-341, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by page control system 500 in general or processing system 520 in particular, direct page control system 500 or processing system 520 to transfer pages for delivery to wireless communication devices, instruct ones of the wireless communication devices associated with the a paging zone to associate with a temporary paging zone identifier, responsively receive indications of at least the temporary paging zone identifier transferred by at least a portion of the wireless communication devices, identify dormant ones of the wireless communication devices based on at least which ones of the wireless communication devices transfer the indications, and instruct the ones of the wireless communication devices associated with the temporary paging zone identifier to resume association with the first paging zone, among other operations. Software 532 can also include data structures which relate wireless communication devices to paging zones or to paging zone identifiers, among other information. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to transfer pages for delivery to wireless communication devices, instruct ones of the wireless communication devices associated with a first paging zone to associate with a temporary paging zone identifier, responsively receive indications of at least the temporary paging zone identifier transferred by at least a portion of the wireless communication devices, identify dormant ones of the wireless communication devices based on at least which ones of the wireless communication devices transfer the indications, and instruct the ones of the wireless communication devices associated with the temporary paging zone identifier to resume association with the first paging zone.

In general, software 532 can, when loaded into processing system 520 and executed, transform processing system 520 overall from a general-purpose computing system into a special-purpose computing system customized to transfer pages for delivery to wireless communication devices, instruct ones of the wireless communication devices associated with a first paging zone to associate with a temporary paging zone identifier, responsively receive indications of at least the temporary paging zone identifier transferred by at least a portion of the wireless communication devices, identify dormant ones of the wireless communication devices based on at least which ones of the wireless communication devices transfer the indications, and instruct the ones of the wireless communication devices associated with the temporary paging zone identifier to resume association with the first paging zone, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Bus 550 comprises a physical, logical, or virtual communication link, capable of communicating data, control signals, and communications, along with other information. Bus 550 also can include RF and power distribution elements, such as wires, circuit board traces, or other elements. In some examples, portions of bus 550 are encapsulated within the elements of network interface 510, processing system 520, and storage system 530, and can be a software or logical link. In other examples, bus 550 uses various communication media, such as air, space, metal, optical fiber, or some other signal propagation path, including combinations thereof. Bus 550 can be a direct link or might include various equipment, intermediate components, systems, and networks.

Referring back to FIG. 1, wireless communication devices (WCD) 151-153 can each comprise one or more antennas, transceiver circuitry elements, and communication elements. The transceiver circuitry typically includes amplifiers, filters, modulators, and signal processing circuitry. Wireless communication devices 151-153 can also each include user interface systems, memory devices, non-transitory computer-readable storage mediums, software, processing circuitry, or some other communication components. Wireless communication devices 151-153 can each be user devices, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Page control system 120 comprises systems and equipment to transfer pages for delivery to wireless communication devices, instruct ones of the wireless communication devices associated with the first paging zone to associate with a temporary paging zone identifier paging zone, responsively receive indications of the temporary paging zone identifier transferred by at least a portion of the wireless communication devices, identify dormant ones of the wireless communication devices based on at least which ones of the wireless communication devices transfer the indications, and instruct the ones of the wireless communication devices associated with the temporary paging zone identifier to resume association with the first paging zone, among other operations. Page control system 120 can include communication or network interfaces, as well as computer systems, microprocessors, circuitry, or some other processing devices or software systems, and can be distributed among multiple processing devices. Examples of page control system 120 can also include software such as an operating system, logs, databases, utilities, drivers, networking software, and other software stored on a computer-readable medium. Page control system 120 can also include mobile switching center (MSC) equipment, radio node controller (RNC) equipment, mobile management entity (MME) equipment, database systems, or other systems.

Communication network 125 comprises communication and control systems for providing access to communication services for user devices. Communication network 125 can provide communication services including voice calls, text messages, data access, or other communication services provided over cellular or wireless communication networks. In some examples, communication network 125 includes equipment to provide wireless access to communication services within different coverage areas to user devices, route communications between content providers and user devices, and facilitate handoffs between equipment of different coverage areas, among other operations. Communication network 125 can also comprise elements such as radio access network (RAN) equipment, E-UTRAN Node B equipment, eNodeB equipment, Evolved Node B equipment, Mobility Management Entity (MME) equipment, Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Wireless access nodes (AN) 111-114 are associated with communication network 125, and provide wireless links for wireless access to the communication services of communication network 125. Wireless access nodes 111-114 each comprise RF communication and control circuitry, transceivers, and antennas, as well as wireless communications equipment capable of communicating with and providing wireless access within a wireless coverage area to communication services for wireless communication devices, such as wireless communication devices 151-153. The RF communication circuitry typically includes amplifiers, filters, RF modulators, transceivers, and signal processing circuitry. Wireless access nodes 111-114 can also each comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Communication links 131-134 each uses metal, glass, optical, air, space, or some other material as the transport media. Communication links 131-134 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 131-134 can be a direct link or can include intermediate networks, systems, or devices, and can include a logical network link transported over multiple physical links.

Wireless links 141-143 can each use the air or space as the transport media. Wireless links 141-143 each comprise one or more wireless communication links provided over an associated wireless frequency spectrum or wireless frequency band, and can use various protocols. Wireless links 141-143 can each comprise a wireless link such as Code Division Multiple Access (CDMA), Evolution-Data Optimized (EVDO), single-carrier radio transmission technology link (1×RTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Long Term Evolution (LTE), LTE Advanced, Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for each of wireless links 141-143 is shown in FIG. 1, it should be understood that wireless links 141-143 are merely illustrative to show communication modes or wireless access pathways for wireless communication devices 151-153. In other examples, further wireless links can be shown, with portions of the further wireless links shared and used for different communication sessions or different content types, among other configurations.

Communication links 131-134 and 141-143 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system to count wireless communication devices in a geographic area, the method comprising:
   receiving geographic data that indicates the geographic area;
   determining wireless coverage sectors in the geographic area;
   identifying wireless access nodes serving the wireless coverage sectors in the geographic area, wherein the wireless access nodes transmit one or more paging zone identifiers;
   transmitting a temporary zone identifier from the wireless access nodes in the geographic area instead of the one or more paging zone identifiers;
   receiving the temporary zone identifier from dormant wireless communication devices in the geographic area and identifying the dormant wireless communication devices in the geographic area;
   transmitting the one or more paging zone identifiers from the wireless access nodes in the geographic area instead of the temporary zone identifier; and
   receiving the one or more paging zone identifiers from the dormant wireless communication devices in the geographic area.

2. The method of claim 1 wherein the geographic area comprises a building.

3. The method of claim 1 wherein the wireless communication system comprises a Mobility Management Entity (MME).

4. The method of claim 1 wherein the wireless access nodes comprise eNodeBs.

5. A wireless communication system to count wireless communication devices in a geographic area, comprising:
   a network interface configured to receive geographic data that indicates the geographic area;
   a page control system configured to determine wireless coverage sectors in the geographic area;
   the page control system configured to identify wireless access nodes serving the wireless coverage sectors in the geographic area, wherein the wireless access nodes transmit one or more paging zone identifiers;
   the network interface configured to transmit a temporary zone identifier from the wireless access nodes in the geographic area instead of the one or more paging zone identifiers;
   the network interface configured to receive the temporary zone identifier from dormant wireless communication devices in the geographic area;
   the page control system configured to identify the dormant wireless communication devices in the geographic area;
   the network interface configured to transmit the one or more paging zone identifiers from the wireless access nodes in the geographic area instead of the temporary zone identifier; and
   the network interface configured to receive the one or more paging zone identifiers from the dormant wireless communication devices in the geographic area.

6. The wireless communication system of claim 5 wherein the geographic area comprises a building.

7. The wireless communication system of claim 5 wherein the wireless communication system comprises a Mobility Management Entity (MME).

8. The wireless communication system of claim 5 wherein the wireless access nodes comprise eNodeBs.

* * * * *